United States Patent [19]
Zapalac

[11] Patent Number: 5,979,483
[45] Date of Patent: Nov. 9, 1999

[54] VALVE ASSEMBLY AND METHOD

[75] Inventor: Ricky Zapalac, Orchard, Tex.

[73] Assignee: Occidental Chemical Corporation, Dallas, Tex.

[21] Appl. No.: 09/104,153

[22] Filed: Jun. 24, 1998

[51] Int. Cl.[6] .............................. F16J 15/40; F16K 41/00
[52] U.S. Cl. .......................... 137/15; 137/240; 251/214; 277/512; 277/516
[58] Field of Search ............................. 251/214; 277/516, 277/514, 512; 137/15, 240, 246.22

[56] References Cited

U.S. PATENT DOCUMENTS

| | | | |
|---|---|---|---|
| 2,029,777 | 2/1936 | Kinnaird . | |
| 2,635,903 | 4/1953 | Hansen ..................................... | 277/514 |
| 3,133,554 | 5/1964 | Joebken . | |
| 3,474,734 | 10/1969 | Stogner .................................... | 277/516 |
| 3,556,472 | 1/1971 | Grove et al. ............................. | 251/214 |
| 3,599,991 | 8/1971 | Combes .................................... | 251/214 |
| 3,627,260 | 12/1971 | Grove ........................................ | 251/214 |
| 3,785,659 | 1/1974 | Maurer et al. ........................... | 277/516 |
| 3,990,679 | 11/1976 | Boitnott .................................... | 251/214 |
| 3,993,284 | 11/1976 | Lukens, Jr. ................................ | 251/214 |
| 4,149,558 | 4/1979 | McGee et al. ............................ | 251/214 |
| 4,270,760 | 6/1981 | Greiman .................................... | 277/516 |
| 4,274,432 | 6/1981 | Tunstall et al. ........................... | 251/214 |
| 4,552,369 | 11/1985 | Stewart et al. ........................... | 251/214 |
| 5,078,175 | 1/1992 | Martin et al. ............................. | 251/214 |
| 5,178,363 | 1/1993 | Icenhower et al. ...................... | 251/214 |
| 5,238,252 | 8/1993 | Stewen et al. ............................ | 251/214 |
| 5,312,087 | 5/1994 | Jones ......................................... | 251/214 |
| 5,642,892 | 7/1997 | Burgess .................................... | 277/516 |

FOREIGN PATENT DOCUMENTS 2074294  10/1981  United Kingdom ................... 251/214

Primary Examiner—George L. Walton
Attorney, Agent, or Firm—Anne E. Brookes; Richard D. Fuerle

[57] ABSTRACT

Disclosed is a valve assembly having a slidable valve stem that passes through a bushing enclosed in a bonnet. At least one circumferential stem seal seals the valve stem to the bushing. At least one passageway is provided through the bushing for injecting a fluid between the valve stem and the bushing to wash out deposits. A second optional passageway is also provided for injecting a lubricant around the valve stem.

20 Claims, 2 Drawing Sheets

VALVE ASSEMBLY AND METHOD

BACKGROUND OF THE INVENTION

This invention relates to a valve assembly having at least one passageway through a bushing through which a fluid can be injected to wash contaminants away from the stem seals. In particular, it relates to a valve assembly for controlling the flow of brine.

Ethylene and propylene gases, produced by cracking crude oil, are often stored in underground salt caverns. To force the gases out of the caverns, brine, which will not dissolve the salt, is pumped into the caverns. Pneumatically operated gate valves are used to control the flow of brine into and out of these caverns. Abrasive salt crystals from the brine tend to adhere to the valve stem. They increase the friction on the stem, making it more difficult to operate the valve, and abrade the stem seals, causing the valve to fail. When a valve becomes so clogged that it can not be opened or closed pneumatically, a worker must be sent into the field to close the valve. This is done by physically pulling the stem up using a tool, a demanding task that can damage the piston retainers on the valve.

SUMMARY OF THE INVENTION

I have discovered that the problems associated with brine valves can be overcome by providing at least one passageway through the bushing that encloses the valve stem. Water is injected through the passageway into the space between the bushing and the valve stem below the stem seals so that crystals of salt and other materials are washed away from the stem seals. The valve remains easily operable and the stem seals are not damaged by abrasive crystals and other deposits. I have further found that a second passageway into the space between the bushing and the valve stem on the other side of the stem seals is useful for providing lubrication to the valve stem.

DESCRIPTION OF THE PREFERRED EMBODIMENTS

Figure 1:
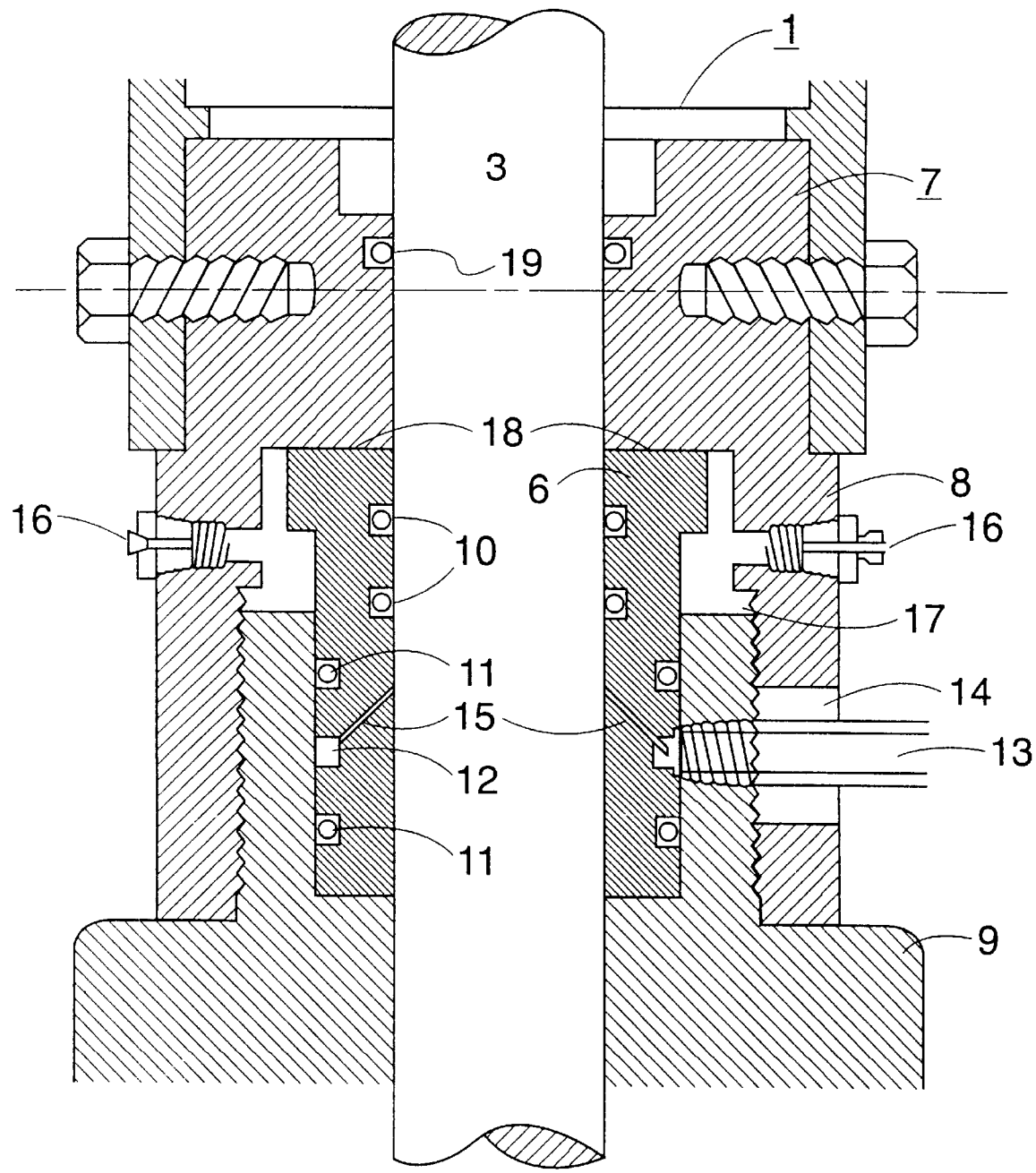
FIG. 1 is an enlarged side view in section of the upper portion of a valve assembly according to this invention.
Figure 2:
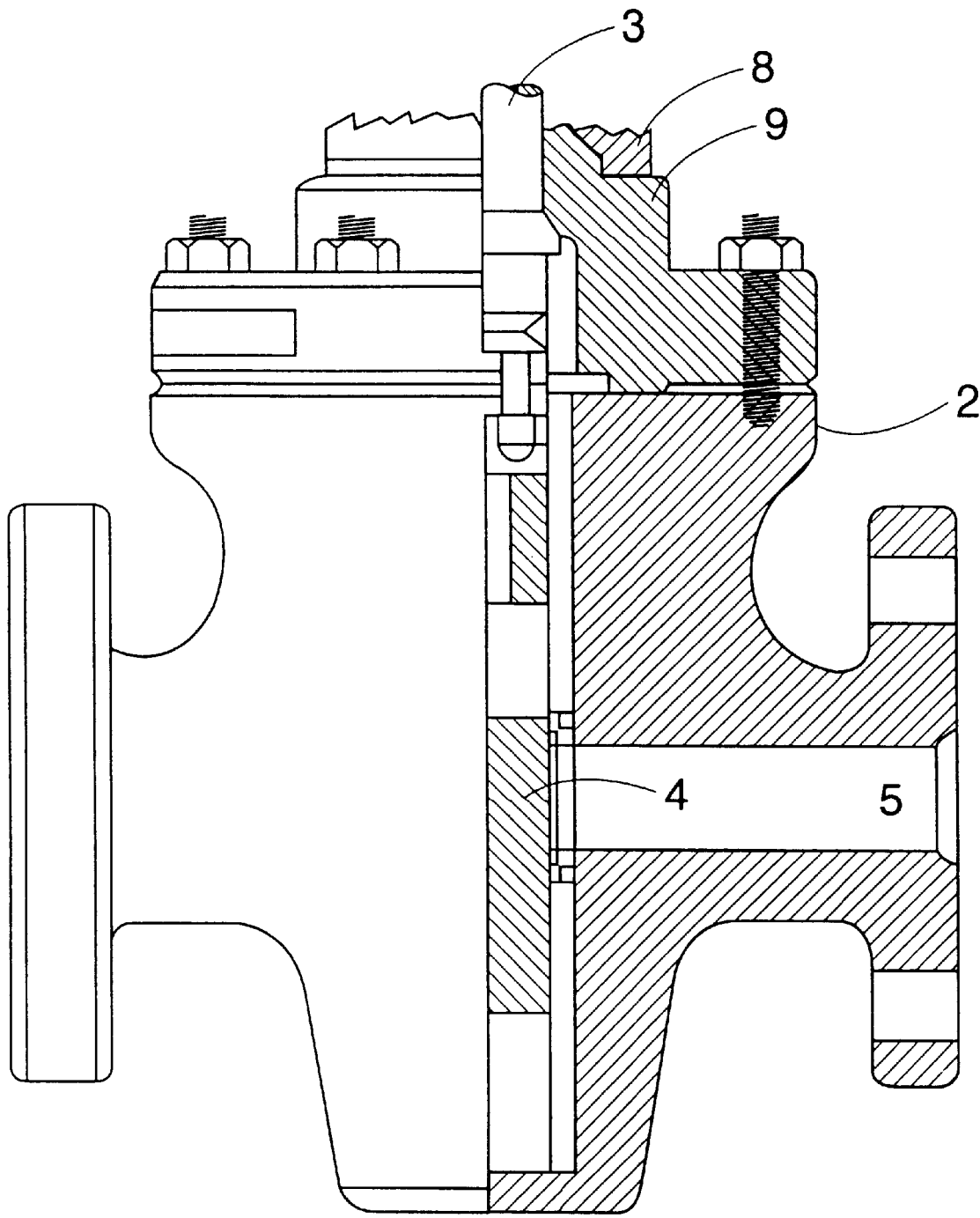
FIG. 2 is a side view partially in section showing the lower portion of a valve assembly according to this invention.

FIG. 1 shows a valve assembly 1 that is attached to the valve housing 2 shown in FIG. 2. In the Figures, slidable valve stem 3 is attached at its lower end to gate valve 4, which controls the flow of fluid through conduit 5. At its upper end, valve stem 3 is attached to an operator (not shown) which can slide it up or down to close or open gate valve 4. Valve stem 3 passes through a bushing 6 which is enclosed within a bonnet 7 having a top portion 8 which is threaded to a bottom portion 9. Bushing 6 is provided with two circumferential stem seals 10 for the purpose of preventing fluid from passing upward in between valve stem 2 and bushing 6. Bushing 6 is also provided with two circumferential o-rings 8 for the purpose of preventing fluid from passing around bushing 6. Finally, bushing 6 is provided with a circumferential groove 12. Leading to groove 12 is injection fitting 13, which passes through aperture 14 in top bonnet 8 and is threaded into bottom bonnet 9. (In some valves, a portion of bonnet 7 performs the function of bushing 6 and there is no separate bushing.)

Six passageways 15 lead from injection fitting 13 to the space between valve stem 3 and bushing 6 at a position below (preferably about ⅛ to about ½ inches away from) the stem seal 10 that is closest to gate valve 4. Injection fitting 13 is preferably positioned in between two o-rings 11 to force lubricant or other materials to enter passageways 15. Preferably, passageways 15 are directed at an angle away from gate valve 4, so that they begin at a position closer to the gate valve 4 than they end; an angle of about 10 to about 45° from the normal to the axis of valve stem 3 is preferred. Passageways 15 are also preferably not directed at the axis of valve stem 3, but are preferably directed at least about 20° away from the axis of valve stem 2. These features of the passageways are designed to provide turbulence near stem seals 10 to aid in dislodging and washing out deposits, especially salt crystals. It is preferable to use at least 3 passageways and 6 to 8 passageways are most preferred. A typical passageway diameter is about ⅛ to about ¼ inches. Alternatively, bushing 6 can be split into two portions along, for example, the lines shown by passageways 15, to form a single circumferential conical passageway, so that the cleaning fluid passes in between two portions of bushing 6.

Valve stem assembly 1 is preferably provided with grease fittings 16 for the purpose of injecting a lubricant into space 17 above bottom bonnet 9. The lubricant can then pass through space 18 between the top of bushing 6 and the bottom of top bonnet 8 to lubricate the space in between valve stem 3 and top bonnet 8. An additional circumferential o-ring 19 is provided to help contain the lubricant.

If the valve is used to regulate the flow of brine, water can be injected into injection fitting 13 every 2 to 60 days. Alternatively, water can be continuously forced into injection fitting 13. Lubrication through grease fittings 16 can be performed every 6 to 12 months, as needed.

I claim:

1. A valve assembly comprising
   (1) a bushing enclosed in a bonnet;
   (2) a slidable valve stem which passes through said bushing;
   (3) a housing attached to said bonnet, having a conduit therethrough;
   (4) a valve within said housing controlled by said valve stem, which regulates the flow of fluid through said conduit;
   (5) at least one circumferential stem seal which seals said valve stem to said bushing; and
   (6) at least one passageway through said bushing for injecting a flushing fluid between said valve stem and said bushing at a position between the circumferential stem seal that is closest to said valve and the end of said bushing that is closest to said valve, whereby said flushing fluid is injected into said passageway passes between said valve stem and said bushing into said conduit to wash contaminants away from said at least one stem seal and into said conduit to prevent damage to said at least one stem seal as said valve stem slides through said bushing.

2. A valve assembly according to claim 1 wherein at least one said passageway leads from a circumferential groove around the outside of said bushing.

3. A valve assembly according to claim 2 wherein two o-rings seal said bushing to said bonnet and said circumferential groove is between said o-rings.

4. A valve assembly according to claim 1 wherein at least one said passageway begins on the outside of said bushing closer to said valve than it ends on the inside of said bushing.

5. A valve assembly according to claim 1 wherein at least one said passageway ends about ⅛ to about ½ inches away from the stem seal closest to said valve.

6. A valve assembly according to claim 1 wherein at least one said passageway is at an angle of at least about 20° away from the axis of said valve stem.

7. A valve assembly according to claim 4 where at least one said passageway is at an angle of about 10 to about 45° to the normal of the axis of said valve stem.

8. A valve assembly according to claim 1 wherein said bushing is divided into two parts and said passageway is said space therebetween.

9. A valve assembly according to claim 1 wherein at least one said passageway has a diameter of about ⅛ to about ¼ inches.

10. A valve assembly according to claim 1 where a grease fitting is provided in said bonnet for admitting lubricant around said valve stem at the end of said bushing that is farthest from said valve.

11. A method of regulating the flow of brine comprising passing said brine through a valve assembly according to claim 1.

12. A valve assembly comprising
   (1) a cylindrical bushing;
   (2) a bonnet enclosing said bushing;
   (3) a slidable valve stem passing through said bushing;
   (4) a housing attached to said bonnet having a conduit therethrough;
   (5) a gate valve slidable across said conduit controlled by said slidable valve stem, where the position of said gate valve in said conduit controls the flow of a fluid through said conduit;
   (6) at least one circumferential stem seal which seals said valve stem to said bushing;
   (7) a circumferential groove in the outside of said bushing;
   (8) at least one o-ring on each side of said circumferential groove that seals said bushing to said bonnet; and
   (9) at least one passageway through said bushing leading from said circumferential groove to the inside of said bushing at a position in between said valve and the circumferential stem seal closest to said valve for injecting a flushing fluid therein, whereby said flushing fluid is forced through said passageway passes between said bushing and said valve stem then into said conduit to wash contaminants away from said at least one o-ring stem seal and into said conduit to prevent damage to said at least one o-ring stem seal as said valve stem slides through said bushing.

13. A valve assembly according to claim 12 wherein at least one said passageway begins on the outside of said bushing closer to said valve than the point at which it ends on the inside of said bushing.

14. A valve according to claim 12 wherein at least one said passageway ends about ⅛ to about ½ inches away from the stem seal closest to said valve.

15. A valve assembly according to claim 12 wherein at least one said passageway is at an angle of at least about 20° away from the axis of said valve stem.

16. A valve assembly according to claim 13 where at least one said passageway is at an angle of about 10 to about 45° to the normal of the axis of said valve stem.

17. A valve assembly according to claim 12 wherein at least one said passageway has a diameter of about ⅛ to about ¼ inches.

18. A valve assembly according to claim 12 where a grease fitting is provided in said bonnet for admitting lubricant around said valve stem at the end of said bushing that is farthest from said valve.

19. A method of regulating the flow of brine comprising passing said brine through a valve assembly according to claim 12.

20. A method of preventing salt crystals from damaging stem seals in a valve assembly that regulates the flow of brine, where said valve assembly includes a slidable valve stem that slides through a bushing and for activating a valve to open and close a fluid flow conduit, and at least one stem seal seals the space between said valve stem and said bushing, said valve assembly comprising:
   providing at least one passageway through said bushing to a space between said valve stem and said bushing at a position between said stem seal closest to said valve and the end of said bushing for injecting a flushing fluid therein, and at least periodically forcing water through said passageway to wash contaminants away from said at least one stem seal and into said conduit to prevent damage to said at least one stem seal as said valve stem slides through said bushing.

* * * * *